United States Patent [19]

Query et al.

[11] 4,050,629

[45] Sept. 27, 1977

[54] FLUID DISPERSION METHOD AND APPARATUS

[76] Inventors: Grady W. Query, 1725 Matthews Mint Hill Road, Matthews, N.C. 28105; O. Grady Query, 768 Wakendaw Blvd., Mount Pleasant, S.C. 29464

[21] Appl. No.: 590,219

[22] Filed: June 25, 1975

[51] Int. Cl.² ........................ A01C 23/00; B05B 17/04
[52] U.S. Cl. ........................................ 239/11; 137/78; 239/66; 239/67; 239/170; 239/172
[58] Field of Search ................ 239/1, 11, 66, 67, 140, 239/146, 170, 171, 172, 274, 286, 563, 177, 77; 307/118; 137/78, 80

[56] References Cited

U.S. PATENT DOCUMENTS

| | | | |
|---|---|---|---|
| 2,104,660 | 1/1938 | Long et al. | 137/78 X |
| 2,988,287 | 6/1961 | Sherman | 239/177 X |
| 3,117,586 | 1/1964 | Cleaver | 137/78 |
| 3,797,740 | 3/1974 | Kah, Jr. | 239/66 X |
| 3,917,168 | 4/1974 | Tenney | 239/77 |

*Primary Examiner*—Evon C. Blunk
*Assistant Examiner*—Andres Kashnikow
*Attorney, Agent, or Firm*—Larry Harold Kline

[57] ABSTRACT

A method and apparatus for dispersing a fluid in an area is disclosed in which the dispersion of the fluid is proportionate to the wind velocity of the area, the fluid is placed in a plurality of aerosol containers, and the fluid is dispersed through a plurality of nozzles of a plurality of pre-determined sizes.

20 Claims, 4 Drawing Figures

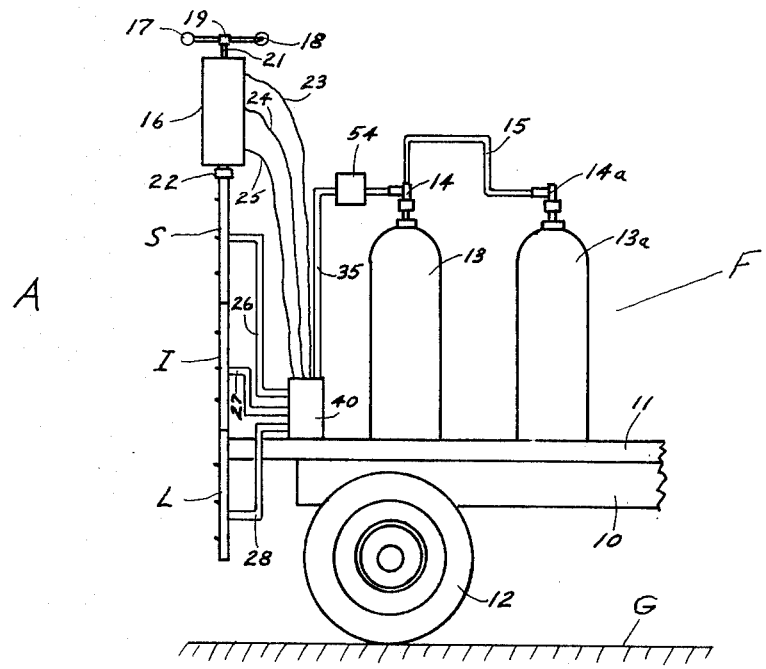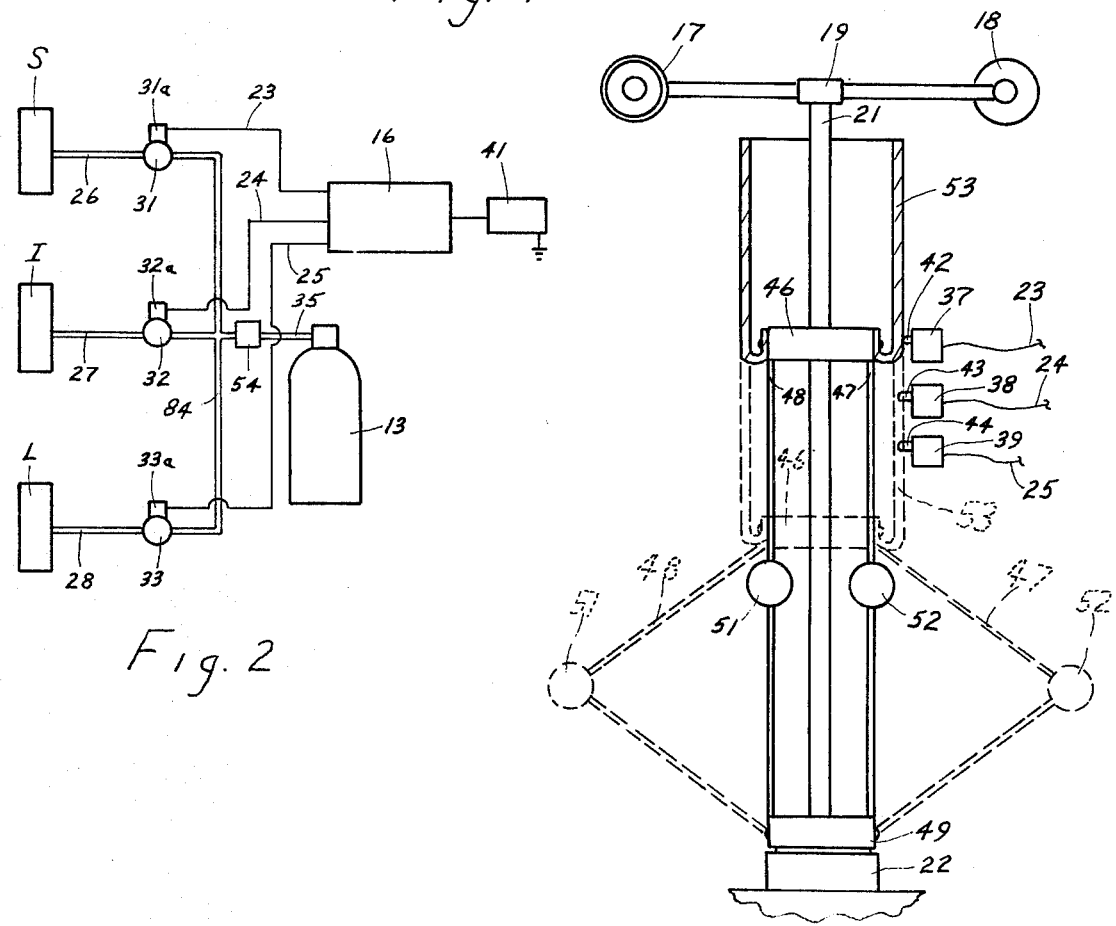

FLUID DISPERSION METHOD AND APPARATUS

This invention relates to a method and apparatus for dispersing insecticide and more particularly to a method and apparatus using a plurality of aerosol containers with the dosage of insecticide dispersed dependent on wind conditions.

A common practice for mosquito or small insect control has been the use of large amounts of fuel oil broken down by heat in order to produce a fog to disperse the insecticide over a large area. More recently, the concept of ultra-low volume has been used in which mechanical means breaks down the particle sizes of the insecticide being used. The smaller particles may be created by high pressure pumps or turbine fans or a combination thereof to allow the insecticide to be freely carried by the wind.

A common practice today for the eradication or at least a substantial reduction in the number of flying insects such as mosquitos, gnats, etc. from open areas such as fields, forests, city streets, beaches and the like is to use various machines for spraying insecticide in the form of a mist or fog into the infected open areas. While the introduction of such an insecticide fog into the air with such machines produces some dispersal of the insecticide, the assistance of the prevailing wind in the sprayed or fogged area is generally enlisted for improved dispersion. Various machines now in use for insecticide fogging include hand-held fogging devices, aircraft spraying and, in particular, large vehicles which support a container of insecticide from which the insecticide is pumped usually in a heated condition for subsequent introduction into the air throughout the area to be treated. As can be understood, such present day apparatus is very complicated and expensive and is subject to the changes in the wind.

Thus, even though some control of the amount of insecticide sprayed may be accomplished manually by the operator, a low wind velocity results in insufficient insecticide distribution and undue concentration in certain areas due to inadequate dispersion. On the other hand, a high wind velocity rapidly removes some of the insecticide fog from the sprayed area similarly resulting in inadequate insecticide coverage and attendant insect "underkill" and insecticide waste.

The present invention eliminates most of the mechanics involved with previous methods by using large aerosol or pressurized containers along with specific size nozzles to disperse the particle size desired. In combination, a wind velocity responsive device, such as an anemometer, is used to determine the wind velocity so that control means, either manual or automatic, may be used to increase or decrease the number of particles released.

An object of the present invention is to provide a new and novel pressurized fluid fogging method and apparatus.

Another object of this invention is to provide a new and novel method and apparatus for spraying an insecticide into the air throughout an area in which the amount of insecticide sprayed is varied in proportion with the velocity of the wind.

A further object of this invention is to provide a new and novel method and apparatus for producing a fog of insecticide which utilizes an insecticide supply container of the aerosol type.

Still another object of this invention is to provide a new and novel insecticide fogging method and apparatus for killing insects in an open area which is simple and inexpensive in construction, which may be readily mounted on a wheeled vehicle for easy movement throughout the area to be fogged and which produces an insecticide fog of the desired concentration for the most efficient coverage of the area.

Still another object of this invention is to provide an insecticide fogging method and apparatus using a plurality of aerosol containers and nozzles of pre-determined sizes.

Another object of this invention is to provide an insecticide fogging method and apparatus for an open area in which the introduction of insecticide into the area is automatically controlled, which produces a uniform distribution of the insecticide throughout the area with virtually no waste and with a maximum of insect kill and which permits the use of conventional aerosol type containers which may be simply and easily replaced when empty.

These and other objects and features of the invention will be apparent from the following description and appended claims.

Briefly, the invention is a method and apparatus for dispersion of fluid in an area comprising controlling the dispersion of the fluid in proportion to the wind velocity in the area. The fluid may be placed in a plurality of aerosol containers and dispersed through a plurality of nozzles of a plurality of pre-determined sizes. The controlling of the dispersion of the fluid may be automatically proportionate to the wind velocity of the area. The dispersion of the fluid may be controlled by a plurality of solenoid valve means, which may be responsive to the wind velocity responsive means, such as an anemometer. The plurality of aerosol containers may be transported throughout the area by ground engagable transport means. The pressure of the fluid may be regulated. The fluid may comprise a mixture of insecticide and gas.

The apparatus may comprise wind velocity responsive means and control means operative to determine the volume of the fluid to be dispersed in the area and dependent on the wind velocity responsive means. The apparatus may further comprise a plurality of aerosol containers within which the fluid may be placed, and a plurality of nozzles of a plurality of pre-determined sizes through which the fluid may be dispersed. Pressure regulating means may be used to regulate the pressure of the fluid. Control means to determine the volume of the fluid to be dispersed may comprise a plurality of solenoid valve means. The control means may be dependent on the wind velocity responsive means such as an anemometer by opening the plurality of solenoid valve means proportionate with the magnitude of the velocity of the wind. The plurality of nozzles may be arranged in a plurality of nozzle assemblies. The nozzles may be placed in a vertical position.

The invention discloses a method for dispersing fluid in an area comprising placing the fluid in a plurality of aerosol containers and dispersing the fluid through a plurality of nozzles of pre-determined sizes. The pressure of the fluid may be regulated prior to dispersing the fluid through the plurality of nozzles.

The invention will be more fully understood from the following detailed description and appended claims when taken with the drawings in which:

FIG. 1 is a side elevation view, partially broken away, of one configuration of the pressurized fluid fogging apparatus of the invention.

FIG. 2 is a partial, schematic view of the arrangement of the component parts of the apparatus of FIG. 1.

FIG. 3 is an enlarged view of a portion of the apparatus of FIG. 1, including the anemometer and automatic switching device 16.

Figure 4:
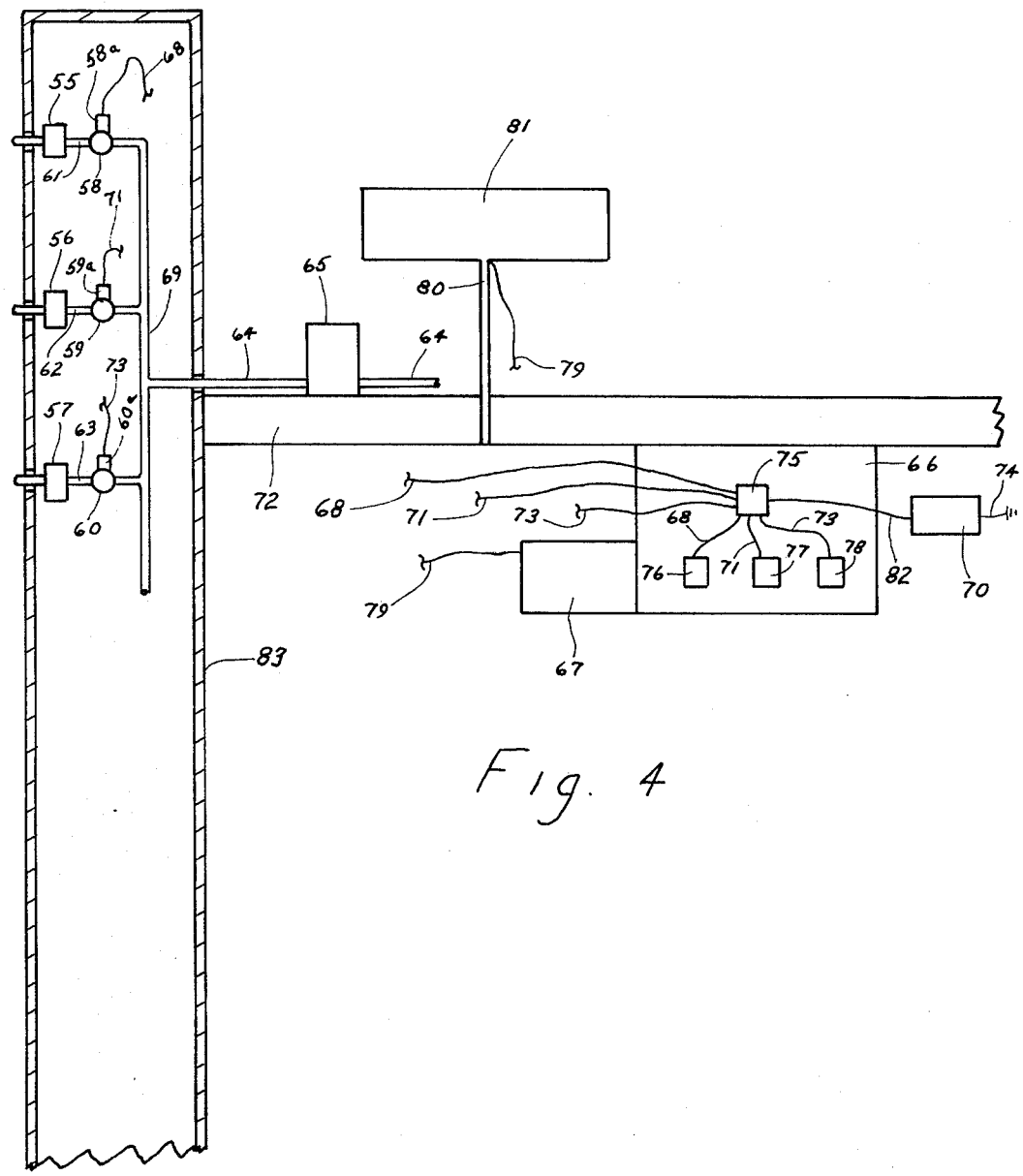
FIG. 4 is a sectioned, partial, schematic view of a configuration of the fogging device using manual controls for switching functions.

Referring now to the drawings, FIG. 1 shows a fogging apparatus constructed in accordance with the invention and designated generally by the letter F. The apparatus F is arranged to introduce a mist or fog of a pressurized fluid such as an insecticide propelled by a gaseous medium into an area designated generally in FIG. 1 by the letter A which may be open such as fields, forests, roads and streets, et. al., for killing airborn insects such as mosquitos, gnats, etc.

The fogging apparatus F includes transport means such as a wheeled vehicle which may be self-propelled or towed and designated generally by the numeral 10. The transport means or vehicle 10 includes a bed 11 supported on a plurality of wheels 12 for movement of the vehicle over the ground G throughout the area A during the fogging operation.

At least one supply container 13 having an outlet 14 is suitably supported on the bed 11 of the vehicle 10 and the container 13 is of the aerosol type containing a pressurized fluid such as an insecticide-gaseous propellant mixture. It should be understood that although a single container 13 may be used, in the preferred embodiment, two or more containers of conventional size, i.e. a 200 pound capacity, are utilized, the second container and its outlet being identified by the numerals 13a and 14a respectively. As shown, the outlets 14 and 14a of the containers 13 and 13a respectively are interconnected by a conduit 15.

Means responsive to the velocity of the wind in the vicinity of the apparatus F are carried by the vehicle 10. More specifically, an anemometer and an automatic switching device 16 are suitably supported on the vehicle 10. The anemometer is of a conventional type provided with a pair of cups or air scoops 17 and 18 positioned in oppositely disposed relationship on a rod 19 supported for free rotation on a vertically extending, rotatable post 21.

As is well known, rotation of the rod 19 in a horizontal plane is produced by the wind striking the scoops 17 and 18. The rotary speed of the rod 19 and post 21 increases in proportion to the velocity of the wind. The post 21 is arranged for rotation on a vertical axis at its lower end in a bearing 22.

The fogging apparatus F also includes a plurality of nozzle assemblies S, I and L supported on the vehicle 10. The nozzle assemblies S, I and L are arranged in a vertical postion connected to each other and suitably mounted on the vehicle bed 11. The upper end of the nozzle assemblies S, I and L may also be utilized for supporting the bearing 22 on which the anemometer post 21 is supported.

Means including normally closed valve means are provided for connecting the nozzle assemblies S, I and L with the supply containers 13 and 13a. The nozzle assemblies S, I and L contain a plurality of spray nozzles. The spray nozzles in each of the nozzle assemblies S, I and L are of a selected size. By way of example, the nozzles in nozzle assembly S are of a small size, the nozzles in nozzle assembly I are of an intermediate size, and the nozzles in nozzle assembly L are of a large size.

As shown in FIGS. 1 and 2, the connecting means includes conduits 26, 27 and 28 connecting at one end with the nozzle assemblies S, I and L respectively. The other ends of the conduits 26, 27 and 28 are arranged to connect through normally closed valves 31, 32 and 33 as shown in FIG. 2. The valves are preferably of the solenoid operated type provided with solenoids 31a, 32a and 33a with electrical wiring 23, 24 and 25 respectively. Conduit 35 is connected to pressure regulating valve 54 which connects to the outlet 14 of supply container 13. The valves 31–33 are housed in an enclosure 40 placed on the vehicle bed 11. Valves 31, 32 and 33 are connected to manifold 84.

The fogging apparatus F includes control means such as automatic switching device 16 operatively conditioned by the wind velocity responsive means or anemometer for opening the valve means or valves 31–33 proportionally with the magnitude of the wind velocity to connect the spray nozzles 23 selectively with the supply containers 13 and 13a through the connecting means or conduits 26–28 whereby the amount of pressurized fluid introduced into the area A by the spray nozzles 23 is varied in proportion to the wind velocity.

FIG. 2 shows the control means 16 which controls the flow of the insecticide to the nozzles by controlling the solenoid valves through which the insecticide flows into the nozzles.

FIG. 3 shows the control means 16 as an automatic device. Included are normally open switches 37, 38 and 39 associated with each of the solenoid operated valves 31, 32 and 33 for connecting the solenoids 31a, 32a and 33a respectively to an associated source of electrical power such as battery 41. Each of the switches 37–39 is provided with a push-button contactor 42, 43 and 44 respectively and means are provided which are connected to the wind velocity responsive means or anemometer for closing the switches 42–44 and progressively actuating the solenoid operated valves 31-33 to connect the nozzle assemblies S, I and L of nozzles 23 with the supply containers 13 and 13a proportionally with the increase in the magnitude of the wind velocity.

Actuation of the push-button contactor 42 closes switch 37 to open valve 31 and connect nozzle assembly S to the supply containers 13 and 13a. Actuation of push-button contactor 42 and 43 closes switch 37 and 38 to open valves 31 and 32 and connect nozzle assemblies S and I to the supply containers 13 and 13a and actuation of push-button contactor 42, 43 and 44 opens valves 31–33 connecting all of the nozzle assemblies S, I and L to the supply containers 13 and 13a.

In order to actuate push-button contactors 42–44, a slidable collar 46 is keyed to the anemometer post 21 for vertical sliding movement with respect to anemometer post 21. The collar 46 is connected by means of a pair of diametrically spaced strip members 47 and 48 to a lower collar 49 secured to the post 21 for rotation therewith adjacent the bearing 22.

A pair of ball weights or spherical elements 51 and 52 are secured to the strip members 47 and 48 respectively between the ends of the strip members 47 and 48. Also secured to the collar 46 is collar actuator 53, arranged to engage sequentially the push-button contactors 42–44 of the switches 37–39 respectively. Thus, in the solid line position of the collar 46 in FIG. 3, corresponding to a low or negligible wind velocity, collar actuator 53 depresses the push-button contactor 42 closing switch 37 to energize solenoid 31a by wire 23, opening valve 31 connecting nozzle assembly S with the supply containers. As the nozzles of nozzle assembly S are of relatively small size, only a small amount of pressurized fluid or insecticide is introduced into the area A.

As the wind velocity increases, the rotary speed of the anemometer increases proportionally and the resulting centrifugal force exerted on the ball elements 51 and 52 moves the ball elements radially outward accompanied by a downward movement of the collar 46. As the collar 46 moves downward, collar actuator 53 depresses push-button contactors 42 and 43 on switch 37 and 38 energizing both solenoids 31a and 32a by wire 23 and 24, thereby opening valves 31 and 32 respectively. At this time, both nozzle assemblies S and I are connected to containers 13 and 13a so that both the small size nozzles of nozzle assembly S and intermediate size nozzles of nozzle assembly I are placed in connection with the supply containers 13 and 13a with a resultant larger amount of pressurized fluid being introduced into the area A.

Further increase in the wind velocity moves the ball elements 51 and 52 into the dotted line position of FIG. 3 so that push-button contactors 42, 43 and 44 are depressed on switches 37, 38 and 39 energizing solenoids 31a, 32a 33a by wires 23, 24 and 25, opening all valves 31-33 connecting all three nozzles assemblies S, I and L to the supply containers 13 and 13a for the introduction of the maximum amount of the pressurized fluid or insecticide into the area A.

FIG. 4 shows a plurality of nozzles 55, 56 and 57 in housing 83. Only three nozzles are shown for purposes of explanation, but a plurality of nozzles, as many as desired, may be used in this configuration of the invention. The plurality of nozzles are connected to a plurality of valves. Each of the plurality of valves is connected to a plurality of conduits.

Nozzle 55 is connected to valve 58 through conduit 61. Nozzle 56 is connected to valve 59 through conduit 62. Nozzle 57 is connected to valve 60 through conduit 63. All of the conduits 61, 62 and 63 are connected through valves to manifold 69. Main conduit 64 connects manifold 69 to pressure regulator or pressure regulating valve 65. Pressure regulator valve 65 is connected to insecticide supply containers as previously discussed in the embodiment of the invention shown in FIG. 1.

Valves 58, 59 and 60 may be solenoid operated valves with associated solenoids 58a, 59a and 60a. Electrical wire 68 connects solenoid 58a to a source of electrical power such as grounded battery 70 through switch box 66. Electrical wire 71 connects solenoid 59a to a source of electrical power such as grounded battery 70 through switch box 66. Electrical wire 73 connects solenoid 60a to a source of electrical power such as grounded battery 70 through switch box 66. All of the wiring from the solenoid goes through master switch 75. Wire 68 passes through switch 75 to switch 76. Wire 71 passes through switch 75 to switch 77. Wire 73 passes through switch 75 to switch 78. Wire 79 leads to wind gauge 67 from anemometer 81. Anemometer 81 is supported by support 80 on bar 72. Wire 82 connects battery 70 to master switch 75. Wire 74 connects battery 70 to ground.

In the configuration of FIG. 4, any number of nozzles may be used. Any number of nozzles could be controlled by each valve. As shown in FIG. 4, each valve controls a single nozzle. An operator, holding switch box 66, can physically control the amount of insecticide released through each nozzle. By watching the wind gauge 67 which is controlled by the anemometer or wind velocity responsive means 81, the operator can release amounts of insecticide desired proportional to the velocity of the wind. The wind gauge 67 can be physically mounted to the switch box 66 or may be independent thereof.

The aerosol tanks may be individually controlled by their own valves. If a mixture of chemicals is desirable, different chemicals could be contained in different tanks and a mixture determined by the use of the valves thereon. The exact dosage of insecticide may be actually determined by the combination of each nozzle and the pressure regulating device. For a given orifice and a known pressure, the exact number of grams of an insecticide released may be determined. The pressure regulating valve can insure proper pressure to the nozzles in view of varying temperatures and pressures. The pressure regulating valve helps in determining the exact dosage to be dispersed through the orifice. The pressure can be pre-set or varied. Once the pressure is set, it would not ordinarly be changed unless the propellants or size of the nozzles were changed. The solenoid valves could be used to activate nozzle assemblies or individual nozzles.

The aerosol containers may be pressurized prior to delivery and would therefore guarantee a proper mixture of the chemical desired.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A method for dispersing a fluid in an area comprising:
   a. determining the wind velocity of said area;
   b. signalling through switching means, dependent on said wind velocity, to a plurality of solenoids;
   c. distributing said fluid in said area through a plurality of valves controlled by said plurality of solenoids;
   d. dispersing said fluid through a plurality of nozzles of a plurality of predetermined sizes; which are operatively associated with said plurality of valves;
   e. arranging said plurality of nozzles into a plurality of nozzle assemblies, each of said plurality of nozzles being of a selected size; and
   f. switching said plurality of valves in order to open said plurality of valves selectively for introducing a selected quantity of fluid into said area, which is proportional with said wind velocity.

2. A method according to claim 1 further comprising placing the fluid in a plurality of aerosol containers.

3. A method according to claim 2 further comprising transporting said plurality of aerosol containers throughout said area.

4. A method according to claim 3 further comprising regulating the pressure of said fluid prior to dispersing said fluid through said plurality of nozzles of pre-determined size.

5. A method according to claim 3 wherein said transporting is accomplished by ground engageable transport means.

6. A method according to claim 1 wherein said signalling is manual.

7. A method according to claim 1 wherein said signalling is automatic.

8. A method according to claim 1 further comprising regulating the pressure of said fluid prior to dispersing said fluid.

9. A method according to claim 8 wherein said fluid comprises an insecticide-gaseous mixture.

10. A method according to claim 1 wherein said determining the wind velocity of said area is accomplished by use of an anemometer.

11. An apparatus for dispersing a fluid in an area comprising:
   a. wind velocity responsive means responsive to the wind in said area;
   b. switching means responsive to said wind velocity responsive means;
   c. a plurality of solenoids operative responsive to said switching means;
   d. a plurality of valves each responsive to one of said plurality of solenoids through which said fluid may be distributed;
   e. a plurality of nozzles of a plurality of pre-determined sized through which said fluid may be dispersed into said area; and
   f. a plurality of nozzle assemblies comprising said plurality of nozzles, being arranged whereby each of said plurality of nozzles in each of said plurality of nozzle assemblies is of a selected size, and wherein said plurality of valves includes a normally closed valve operatively associated with each of said nozzle assemblies, and wherein said switching means is arranged to open said plurality of valves selectively for introducing a selected quantity of said fluid into said area which is proportional with said wind velocity.

12. An apparatus according to claim 11 further comprising a plurality of aerosol containers within which said fluid may be placed.

13. An apparatus according to claim 12 wherein said pressurized fluid comprises an insecticide-gaseous mixture.

14. An apparatus according to claim 11 further comprising pressure regulating means operative to regulate the pressure of said fluid prior to being dispersed through said plurality of nozzles.

15. An apparatus according to claim 11 wherein said switching means is manual.

16. An apparatus according to claim 11 wherein said switching means is automatic.

17. An apparatus according to claim 11 wherein said plurality of nozzle assemblies are placed in a vertical position.

18. An apparatus according to claim 17 wherein said nozzles in successive nozzle assemblies are of progressively increasing size.

19. An apparatus according to claim 18 wherein said plurality of nozzles are arranged in three nozzle assemblies, the first nozzle assembly being provided with nozzles of the smallest size, the second nozzle assembly being provided with nozzles of an intermediaate size and the third nozzle assembly being provided with nozzles of the largest size.

20. An apparatus according to claim 11 wherein said wind velocity responsive means comprises an anemometer.

* * * * *